United States Patent
Sandell

(10) Patent No.: US 11,582,029 B2
(45) Date of Patent: Feb. 14, 2023

(54) SECRET KEY GENERATION FOR WIRELESS CHANNELS

(71) Applicant: Kabushiki Kaisha Toshiba, Tokyo (JP)

(72) Inventor: Magnus Stig Torsten Sandell, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 140 days.

(21) Appl. No.: 16/951,467

(22) Filed: Nov. 18, 2020

(65) Prior Publication Data

US 2022/0158825 A1 May 19, 2022

(51) Int. Cl.
| | | |
|---|---|---|
| H04L 29/06 | (2006.01) | |
| H04L 9/08 | (2006.01) | |
| H04W 72/0453 | (2023.01) | |
| H04J 1/02 | (2006.01) | |
| H04W 12/037 | (2021.01) | |

(52) U.S. Cl.
CPC ............ *H04L 9/085* (2013.01); *H04J 1/02* (2013.01); *H04L 9/0838* (2013.01); *H04L 9/0861* (2013.01); *H04W 12/037* (2021.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 2003/0203717 | A1* | 10/2003 | Chuprun | H04B 7/18591 455/12.1 |
| 2011/0003606 | A1* | 1/2011 | Forenza | H04B 7/0417 455/501 |
| 2011/0044193 | A1* | 2/2011 | Forenza | H04B 7/0456 370/252 |
| 2012/0087430 | A1* | 4/2012 | Forenza | H04B 7/0626 375/267 |
| 2014/0129152 | A1* | 5/2014 | Beer | G16B 20/20 702/19 |
| 2019/0312734 | A1* | 10/2019 | Wentz | H04L 9/0877 |
| 2021/0124006 | A1* | 4/2021 | Sheng | G01S 3/10 |

OTHER PUBLICATIONS

Miltev, Miroslav et al. Subcarrier Scheduling for Joint Data Transfer and Key Generation Schemes in Multicarrier Systems. 2019 IEEE Global Communications Conference (GLOBECOM). https://ieeexplore.ieee.org/stamp/stamp.jsp?tp=&arnumber=9013809 (Year: 2019).*

(Continued)

*Primary Examiner* — Jeremiah L Avery
(74) *Attorney, Agent, or Firm* — Oblon, McClelland, Maier & Neustadt, L.L.P.

(57) ABSTRACT

A method of operating a first node to generate a secret key for encrypting wireless transmissions between the first node and a second node. The method comprises receiving a first training signal comprising a plurality of subcarriers from the second node and constructing a matrix from the frequency responses of each of the plurality of subcarriers of the first training signal at the first node. A singular value decomposition of the matrix is computed; and a secret key is derived from one or more singular vectors of the singular value decomposition.

17 Claims, 4 Drawing Sheets

(56) References Cited

OTHER PUBLICATIONS

Li, Hao et al. Eavesdropping-Resilient OFDM System Using Sorted Subcarrier Interleaving. IEEE Transactions on Wireless Communications, vol. 14, Issue: 2. https://ieeexplore.ieee.org/stamp/stamp.jsp?tp=&arnumber=6936355 (Year: 2014).*

Wang, T. et al., Survey on channel reciprocity based key establishment techniques for wireless systems, Wireless Network, vol. 21, 2015, 12 pages.

Xu, W. et al., "LoRa-Key: Secure Key Generation System for LoRa-Based Network," IEEE Internet of Things Journal, vol. 6, No. 4, Aug. 2019, 13 pages.

Sayeed, A. et al., "Secure Wireless Communcations: Secret Keys Through Multipath," in International Conference on Acoustics, Speech and Signal Processing, Law Vegas, USA, 2008, 4 pages.

Zhang, J. et al., "Efficient Key Generation by Exploiting Randomness From Channel Responses of Individual OFDM Subcarriers," IEEE Transactions on Communications, vol. 64, No. 6, Jun. 2016, 11 pages.

Goel, S. et al., "Guaranteeing Secrecy using Artificial Noise," IEEE Transactions on Wireless Communications, vol. 7, No. 6, Jun. 2008, 10 pages.

Marzban, M. F. et al., "Securing OFDM-Based Wireless Links Using Temporal Artificial-Noise Injection," in IEEE Consumer Communications & Networking Conference, Las Vegas, USA, 2018, arXiv:1803.00211v1 [cs.IT], Mar. 1, 2018, 6 pages.

Aldaghri, N. et al., "Physical Layer Secret Key Generation in Static Environments," IEEE Transactions on Information Forensics and Security, vol. 15, 2020, arXiv:1908.03637v2 [cs.IT], Feb. 13, 2020, 14 pages.

Hong, Y.-W. P. et al., "Vector Quantization and Clustered Key Mapping for Channel-Based Secret Key Generations," IEEE Transactions on Information Forensics and Security, vol. 12, No. 5, May 2017, 12 pages.

* cited by examiner

SECRET KEY GENERATION FOR WIRELESS CHANNELS

FIELD

Embodiments described herein relate to methods and systems for generating secret keys for encrypting wireless communications between pairs of transceivers.

BACKGROUND

Symmetric key techniques for securing a wireless transmission use the same secret (private) key to encrypt and decrypt a message. Such a secret key must therefore be known to both the transmitter and receiver of the message, but must not be known to or determinable by any eavesdroppers in order to guarantee the security of the message. In order to minimise vulnerabilities from wirelessly distributing or reusing secret keys, pairs of wireless devices may be configured to generate secret keys themselves using random properties of wireless channels between them.

Survey on channel reciprocity based key establishment techniques for wireless systems (Wang et al. Wireless Networks, vol 21, pp. 1835-1845, 2015) presents examples of methods of generating secret keys by quantising received signal strengths, frequency-phase information, or channel impulse response.

Arrangements of the embodiments will be understood and appreciated fully from the following detailed description, made by way of example only and taken in conjunction with the drawings in which.

DETAILED DESCRIPTION

Figure 1:
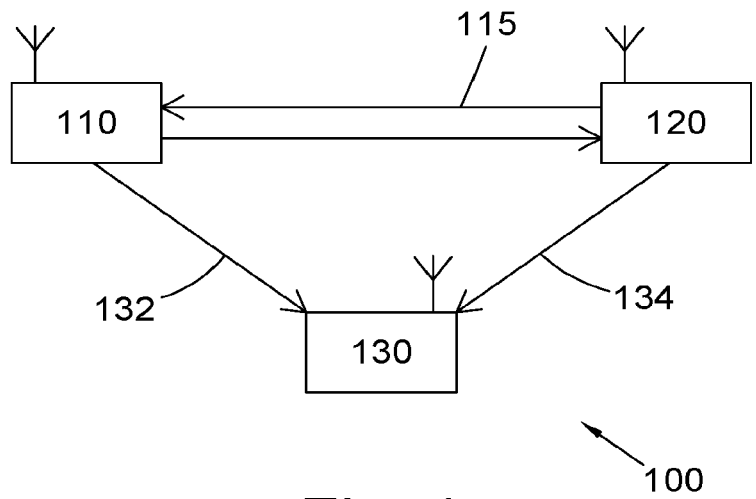
FIG. 1 is a diagram of an example wireless network comprising two legitimate network nodes communicating in the presence of an eavesdropping node.

According to an embodiment there is provided a method of operating a first node to generate a secret key for encrypting wireless transmissions between the first node and a second node; the method comprising: receiving a first training signal comprising a plurality of subcarriers from the second node, constructing a matrix from the frequency responses of each of the plurality of subcarriers of the first training signal at the first node; computing a singular value decomposition of the matrix; and deriving a secret key from one or more singular vectors of the singular value decomposition.

The first training signal may be an orthogonal frequency-division multiplexing signal.

The secret key may be derived from magnitudes of entries of the one or more singular vectors.

The one or more singular vectors may be the first right singular vector of the calculated singular value decomposition.

The matrix may be constructed with entries equal or proportional to the frequency responses of each of the plurality of subcarriers.

In some embodiments, the method may further comprise generating and transmitting a second training signal.

In some embodiments generating the second training signal may comprise including artificial noise in each of the subcarriers of the second training signal. The artificial noise added to each subcarrier may be equal to an entry corresponding to that subcarrier in a matrix defined by a weighted sum of products of pairs of singular vectors of higher order than the one or more singular vectors from which the secret key is derived, multiplied by that subcarrier of the first training signal, and divided by the entry corresponding to that subcarrier in the matrix constructed from the frequency responses of each of the plurality of subcarriers of the first training signal at the first node.

In some embodiments, generating the second training signal may comprise adding artificial noise to the first training signal in a null space of a matrix defined by the sum of the products of the one or more singular vectors from which the secret key is derived and the singular vectors with which they are paired in the single value decomposition.

According to an embodiment, there is provided one or more non-transitory storage media comprising computer instructions executable by one or more processors, the computer instructions when executed by the one or more processors causing the processors to perform a method of operating a first node to generate a secret key for encrypting wireless transmissions between the first node and a second node; the method comprising: receiving a first training signal comprising a plurality of subcarriers from the second node, constructing a matrix from the frequency responses of each of the plurality of subcarriers of the first training signal at the first node; computing a singular value decomposition of the matrix; and deriving a secret key from one or more singular vectors of the singular value decomposition.

The method implemented by executing the computer instructions may comprise any of the optional features of the method described herein.

A wireless node comprising an antenna, a memory and a processor, the memory comprising computer instructions executable by the processor, the computer instructions when executed by the processor causing the processor to perform a method of operating the node to generate a secret key for encrypting wireless transmissions between the node and another node; the method comprising: receiving a first training signal comprising a plurality of subcarriers from the other node, constructing a matrix from the frequency responses of each of the plurality of subcarriers of the first training signal at the first node; computing a singular value decomposition of the matrix; and deriving a secret key from one or more singular vectors of the singular value decomposition.

The method of operating the node that is implemented by executing the computer instructions may comprise any of the optional features of the method described herein.

FIG. 1 shows a general example of a system 100 in which a secret key may be generated using embodiments described herein to secure communications between a pair of wireless communication nodes 110, 120 against an eavesdropping node 130.

The example system 100 comprises three nodes 110, 120, 130. Two of the nodes are legitimate nodes 110, 120, which wish to securely communicate with each other without the third eavesdropper node 130 being able to extract information from their communications.

The nodes 110, 120, 130 are wireless devices, which may be defined by and/or may comprise transceivers. One, some or all of the nodes may comprise only a single antenna. The legitimate nodes may each comprise only a single antenna each, and may define or be comprised by a single input single output (SISO) system. The nodes may comprise other elements, such as processing means and memories, which may store computer instructions; alternatively, or additionally, the nodes may be in communication with and/or controlled by other computing devices.

All three nodes 110, 120, 130 communicate via a shared wireless transmission medium. Separate wireless channels 115, 132, 134 are defined within the medium between each pair of nodes 110, 130. A legitimate wireless channel 115 is defined between the first and second legitimate nodes 110, 120 and two eavesdropping channels 132, 134 are defined between the eavesdropper and the first and second legitimate nodes respectively. The shared transmission medium and channels therein may define the physical layer of a network comprising the legitimate nodes 110, 120.

Signals may propagate along the channels 115, 132, 134 between the nodes 115, 132, 134 via multiple paths. Such multipath propagation may result in different components travelling via different paths and arriving at the receiving node at different times (time dispersion), where they may interfere with each other resulting in partial self-cancellation or fading. As the phase difference between the different components is dependent upon both the path difference between the components and their wavelengths, a given path difference will result in different phase differences for different frequency components of the signal. This results in frequency-selective fading, in which different frequency components interfere differently and are differently attenuated. In such multipath channels, the lengths of one or more paths may vary randomly with time, resulting in random frequency-selective fading of different frequency components.

The different channels 115, 132, 134 will have different channel state information (sometimes referred to as channel coefficients, channel characteristics, channel responses, channels, or when measured as channel estimates) which describes how a signal propagates from the transmitter to the receiver of the channel. Channel state information may be given in the frequency domain as a complex number, with a magnitude and an argument describing the amplitude and phase respectively of a received signal transmitted via the channel relative to the signal as transmitted. The channel state information may describe the combined effect of scattering, fading and/or power decay with distance of a signal transmitted via the channel and may be dependent upon the arrangement of the nodes 110, 120, 130 within the physical environment in which the system is located.

As described above, different frequency components of a signal transmitted via a channel may have different phase shifts and/or attenuations. Therefore, the channel state information may be dependent upon the frequency of the transmitted signal. Different frequency components, such as different subcarriers may have their own frequency responses, defining the received amplitude and phase shift of a signal or signal component transmitted via the channel at that frequency. In a single input single output (SISO) frequency multiplexed channel, the frequency responses of a plurality of subcarriers may define the channel state information of the channel.

As described above, channel properties may vary with time (for example randomly) and as such the channel state information and/or individual frequency responses may vary with time.

Channel state information and/or frequency responses may be determined or estimated at a given time by receiving and measuring signals transmitted via the channels. For example, the measured phase shift and gain of a received known training or reference signal at a given frequency may be used to determine the frequency response of the channel at that frequency. Such measurements may only be performed by the nodes between which the channel extends, thereby preventing the eavesdropper node 130 from measuring channel characteristics of the legitimate channel 115 between the legitimate nodes 110, 120.

If the eavesdropper node 130 is located more than a few wavelengths from either of two legitimate nodes 110, 120, the channel 115 between the two legitimate nodes 110, 120 will be substantially and/or effectively uncorrelated with either of the channels 132, 134 to the eavesdropper node. This may prevent the eavesdropper node 130 estimating the channel 115 between the nodes from measurements of either of its own channels 132, 134 with the nodes.

Additionally, the channels are substantially reciprocal, allowing both nodes at either end of a given channel to estimate the same channel state information and/or frequency responses by each measuring the channel as described above. As such channel state information and/or frequency responses of the legitimate channel 115 are therefore measurable by both of the two legitimate nodes 110, 120 and not by the eavesdropping node 130. They may therefore be used derive a secret key that is shared by the two legitimate nodes 110, 120 and is not known to the eavesdropping node 130 in order to provide physical layer security.

The reciprocity of the channel 115 may be imperfect, for example due to the non-simultaneous times at which half-duplex nodes 110, 120 receive known training signals transmitted via the channel 115 or due to differences in the noise added by the different receivers of the different nodes 110, 120. This may limit the certainty with which a pair of nodes 110, 120 can mutually determine channel characteristics and by extension the generation of a secret key for the channel 115.

Secure encryption of transmitted messages, requires the generated secret key to be random and for new random secret keys to be generated over time. It is therefore necessary for the measured characteristics of the channel 115 from which the secret key is generated to vary randomly over time.

The degree to which the channel state information and/or frequency responses vary randomly over time may be dependent upon the system 100 and the environment in which it located. For example, the received signal strength of signals transmitted via the channel 115 may vary with time as the nodes 110, 120 between which the channel extends and/or other objects move within the environment. However, the variation of this characteristic is limited in static environments, in which it would be less suitable for use as in input for generating a secret key.

The nodes are configured to transmit signals, such as training signals, comprising multiple subcarriers at different frequencies. For example, the nodes may be configured to transmit signals using frequency-division multiplexing. In some embodiments, the nodes may be configured to transmit signals using frequency-division multiplexing (OFDM).

Embodiments described herein utilise random variations in the frequency responses of a channel between nodes as inputs for generating secret keys for encrypting communication via that channel. Specifically, embodiments herein utilise measured or estimated frequency responses of a plurality of subcarriers as inputs. These frequency responses may vary significantly randomly with small variations in multipath propagation of the channel over time.

Figure 2:
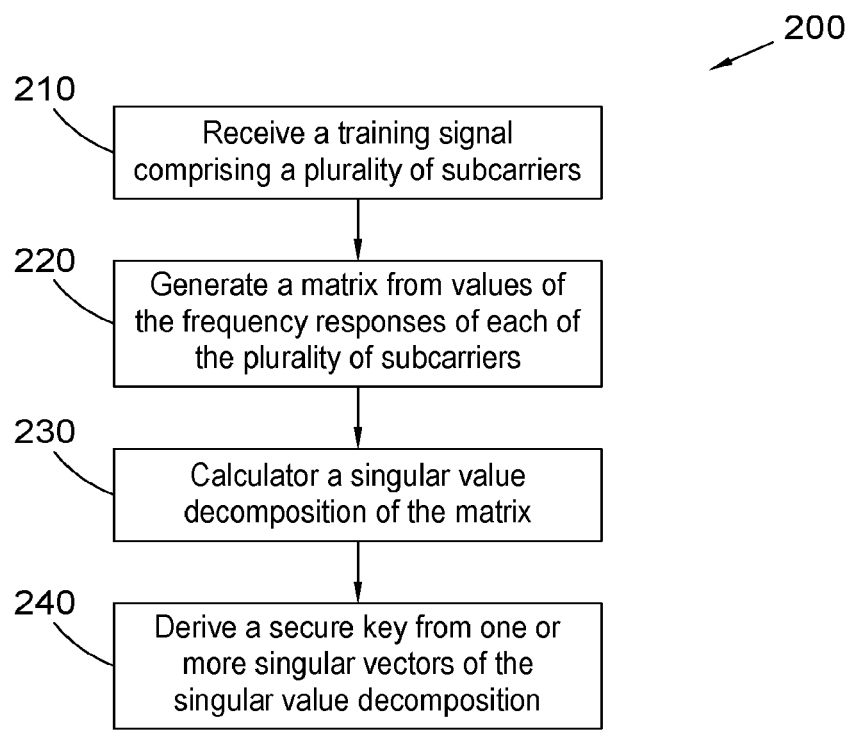
FIG. 2 is a flow chart of an embodiment of a method of operating a first node to generate a secret key for wireless transmissions with a second node.

FIG. 2 is a flow chart of a first method 200 of operating a first node to generate a secret key fix wireless transmissions between the first node and a second node. The first and second nodes may be nodes such as the first and second legitimate nodes 110, 120 of the example system 100 described above with reference to FIG. 1.

In a first step 210 of the method, the first node 110 receives a training signal (which may be referred to as a reference or pilot signal) comprising a plurality of subcarriers from the second node 120. The plurality of subcarriers may be all the subcarriers used by the training signal, or a subset thereof. The contents and/or properties of the training signal as transmitted may be known to the first node 110, or to both of the legitimate nodes 110, 120. The training signal may be a predefined and/or reference signal.

The training signal is a wireless signal and is therefore receivable by any suitable receivers within range of the second node 120, including eavesdropper nodes 130. However, the exact signal received by each receiver depends upon the characteristics of the channel between the second node 120 and that receiver. Therefore, the first node 110 will receive the training signal differently from any eavesdropper nodes 130 that are not located within a few wavelengths of the first node 110. The contents of the training signal may be known to both the first and second node.

The training signal may be transmitted using frequency division multiplexing, or orthogonal frequency division multiplexing (OFDM). Signals transmitted using OFDM comprise a plurality of closely spaced overlapping orthogonal subcarriers (sometimes referred to as tones). In such a training signal, the different subcarriers may be received with different random attenuations and phase shifts due to multipath propagation of the signal.

In some embodiments, the received training signal may be pre-processed. This may advantageously remove noise from the signal that limits the reciprocity of the channel 115 between the first and second nodes 120.

The first node 110 may measure or estimate a channel 115 via which the training signal was transmitted using the received first training signal. Measuring or estimating the channel 115 may comprise measuring or estimating the frequency responses of each of the plurality of subcarriers.

The first training signal may be transmitted and received by single antennas on the transmitting second node and the receiving first node respectively (such that the first training signal is a SISO signal). The first training signal being a SISO signal may result in the channel only comprising a single frequency response for each subcarrier frequency.

A second step 220 of the method comprises constructing a matrix from values of the frequency responses of each of the plurality of subcarriers of the training signal at the second receiver. Constructing the matrix may comprise reshaping a frequency-domain channel estimate into a matrix.

The values of the frequency responses of the plurality of subcarriers may be complex numbers. Such values may each have a magnitude (or modulus) representing the amplitude of that subcarrier as received by the first node relative to the amplitude of that subcarrier as transmitted by the second node and a phase (or argument) representing the phase shift of that subcarrier as received by the first node relative to the phase of that subcarrier as transmitted by the second node. The first node 110 may measure the frequency response of each of the plurality of subcarriers, for example by comparing the received subcarrier to the known amplitude and phase with which that subcarrier in the training signal as transmitted by the second node 120.

The constructed matrix may comprise entries (elements) equal to, or proportional to, the frequency responses of each of the plurality of subcarriers. Alternatively, the constructed matrix may comprise entries equal or proportional to elements of the frequency responses of each of the plurality of subcarriers (such as the magnitudes or phases thereof the frequency responses of each of the plurality of subcarriers. Alternatively, the constructed matrix may comprise entries derived from each of the frequency responses or elements thereof using identical functions (for example, the constructed matrix may comprise entries equal or proportional to the gain of each plurality of subcarriers (which is proportional to the square of the amplitude of the frequency response)).

The entries equal to, proportional to, or derived from each of the subcarrier frequency responses (or elements thereof) values may be arranged within the matrix sequentially in the order of the frequencies of the subcarriers whose frequency responses they are equal to, proportional to, or derived from. For example, these entries may be arranged sequentially in column major order or row major order.

In some embodiments, the matrix may comprise dummy value entries in addition to the entries equal to, proportional to, or derived from the frequency response values (or elements thereof). Such dummy value entries may be zero or may be repetitions of values equal to, proportional to, or derived from the frequency responses. Dummy value entries may be arranged in the positions of one, some, or all unused, null, subcarriers in the sequence of subcarriers. Alternatively, or additionally dummy values may be arranged on either side of the entries equal to, proportional to, or derived from the frequency responses (or elements thereof) of the highest and/or lowest frequency subcarriers. Dummy value entries may be arranged between entries equal to, proportional to, or derived from frequency responses (or elements thereof), or on either side of those of the highest and/or lowest frequency subcarriers if the number of subcarriers is not equal to the number of entries of the matrix.

For example, a training signal is received 210 with fifty-six active subcarriers with twenty-eight active subcarriers on either side of an unused, "null", central subcarrier, entries equal to the frequency responses of the active subcarriers ($h_{-28}$, $h_{-27}$, . . . , $h_{-1}$, $h_1$, . . . , $h_{27}$, $h_{28}$) may be arranged sequentially an eight by eight matrix. The matrix may comprise four dummy value entries before the entry corresponding to the lowest frequency, three dummy value entries arranged after the entry corresponding to the highest frequency, and one dummy entry value in the position of the null central subcarrier. Such a matrix is shown below:

$$\begin{pmatrix} 0 & h_{-24} & h_{-16} & h_{-8} & 0 & h_8 & h_{16} & h_{24} \\ 0 & h_{-23} & h_{-15} & h_{-7} & h_1 & h_9 & h_{17} & h_{25} \\ 0 & h_{-22} & h_{-14} & h_{-6} & h_2 & h_{10} & h_{18} & h_{26} \\ 0 & h_{-21} & h_{-13} & h_{-5} & h_3 & h_{11} & h_{19} & h_{27} \\ h_{-28} & h_{-20} & h_{-12} & h_{-4} & h_4 & h_{12} & h_{20} & h_{28} \\ h_{-27} & h_{-19} & h_{-11} & h_{-3} & h_5 & h_{13} & h_{21} & 0 \\ h_{-26} & h_{-18} & h_{-10} & h_{-2} & h_6 & h_{14} & h_{22} & 0 \\ h_{-25} & h_{-17} & h_{-9} & h_{-1} & h_7 & h_{15} & h_{23} & 0 \end{pmatrix}$$

In some embodiments, the constructed matrix may comprise no other entries in addition to those equal to, proportional to, or derived from frequency responses (or elements thereof) and any optional dummy value entries.

The dimensions of the constructed matrix may depend upon the degree of frequency-selective fading in signals transmitted by the channel. For example, more columns may be used in matrices constructed from the channel estimate of more frequency selective channels with more uncorrelated subcarriers.

A third step 230 of the method comprises calculating the singular value decomposition (SVD) of the matrix generated in the second step 220. The singular value decomposition of an m×n matrix H is a factorization of that matrix in the form:

$$H = U\Sigma V^H$$

Where U is an m×m unitary matrix, V is an n×n unitary matrix, $V^H$ is the conjugate transpose (Hermitian transpose) of V, and $\Sigma$ is an m×n diagonal matrix with non-negative real numbers on the diagonal that decrease in magnitude along the diagonal. The number of non-zero numbers on the diagonal of $\Sigma$ is r, the rank of H.

The columns of the unitary matrices U and V are referred to as the left-singular vectors $u_1, u_2, \ldots, u_m$ and the right singular vectors $v_1, v_2, \ldots, v_n$ respectively, and the numbers on the diagonal of $\Sigma$ are referred to as the singular values $\sigma_1, \sigma_2, \ldots, \sigma_r$. For example, in the situation where m<n, and the rank r=m the matrix H may be expressed as:

$$H = \begin{pmatrix} | & | & & | \\ u_1 & u_2 & \ldots & u_m \\ | & | & & | \end{pmatrix} \begin{pmatrix} \sigma_1 & 0 & \ldots & 0 \\ 0 & \sigma_2 & \ldots & 0 \\ \vdots & \vdots & \ddots & 0 \\ 0 & 0 & 0 & \sigma_m \\ \vdots & \vdots & \vdots & \vdots \\ 0 & 0 & 0 & 0 \end{pmatrix} \begin{pmatrix} | & | & & | \\ v_1 & v_2 & \ldots & v_n \\ | & | & & | \end{pmatrix}^H$$

In general, the matrix H may be expressed as:

$$H = \sigma_1 u_1 v_1^H + \sigma_2 u_2 v_2^H + \ldots + \sigma_r u_r v_r^H$$

The first term, $\sigma_1 u_1 v_1^H$ of this sum is the best rank 1 approximation of H, and the sum of the first and second terms, $\sigma_1 u_1 v_1^H + \sigma_2 u_2 v_2^H$ is the best rank 2 approximation of H, etcetera.

The right singular vectors define an orthonormal basis of the row space of the constructed matrix H (the set of all possible linear combinations of the row vectors of H). In embodiments in which the entries of the matrix H are arranged in column major order, each row vector may consist of entries equal to, proportional to, or derived from frequency responses spaced out across the band of frequencies of the first training signal. Such entries will therefore be equal to, proportional to, or derived from frequency responses of subcarriers that are more spaced apart in the frequency domain and less correlated to those with which the entries of the column vectors are equal, proportional or derived. Random variations in the frequency responses across the frequencies of the training signal therefore result in significant random variations in the right singular vectors.

Similarly, the left singular vectors define an orthonormal basis of the column space of the constructed matrix H (the set of all possible linear combinations of the column vectors of H). In embodiments in which the entries of the matrix H are arranged in row major order, each column vector may consist of entries equal to, proportional to, or derived from frequency responses spaced out across the band of frequencies of the first training signal. Such entries will therefore be equal to, proportional to, or derived from frequency responses of subcarriers that are more spaced apart in the frequency domain and less correlated to those with which the entries of the row vectors are equal, proportional or derived. Random variations in the frequency responses across the frequencies of the training signal therefore result in significant random variations in the left singular vectors.

A fourth step 240 of the method comprises deriving a secret key from one or more singular vectors of the singular value decomposition.

Singular vectors of the singular value decomposition of a matrix defined by the reshaped frequency domain channel estimate of multiple subcarriers of a channel may advantageously represent the random frequency-selective fading of the channel in such a way to allow secret keys to be generated therefore with a relatively high degree of randomness, at a relatively high rate and/or with a relatively low key disagreement probability.

In some embodiments, the one or more singular vectors may be the one or more most significant left and/or right singular vectors (i.e. those the one or more singular vectors corresponding to the highest singular values). In embodiments in which entries of the matrix equal to, proportional to, or derived from each of the subcarrier frequency responses (or elements thereof) are arranged sequentially in column major order, the one or more singular vectors may be right singular vectors. Alternatively, in embodiments in which entries of the matrix equal to, proportional to, or derived from each of the subcarrier frequency responses (or elements thereof) are arranged sequentially in row major order, the one or more singular vectors may be left singular vectors. For example, in embodiments using a constructed matrix such as the example shown above, the one or more singular vectors may be the first right singular vector $v_1$.

Deriving a secret key from the one or more singular vectors may comprise quantising the one or more singular vectors into binary bits. This may comprise converting each of all or some of the elements of the one or more singular vectors into one more binary bits. Quantising the one or more singular vectors may remove noise therefrom.

In some such embodiments, the secret key and/or binary bits thereof may be derived from all or some of the elements of the one or more singular vectors using scalar quantisation. For example, one or more scalar values may be defined from each of these elements (for example, the magnitudes of the real and/or imaginary parts of each element). A plurality of sequential one-dimensional quantisation intervals may be defined spanning the range of these scalar values and each of the scalar values may then be mapped to one or more quantised bits based on which of the quantisation intervals in which it falls.

Alternatively, or additionally, the secret key and/or binary bits thereof may be derived from all or some of the elements of the one or more singular vectors using vector quantisation. For example, one or more multi-dimensional vectors or coordinates may each be defined by one or more elements of one or more singular vectors (for example, the real and imaginary parts of each of the elements may together define a two-dimensional vector or coordinates) and a plurality of multi-dimensional quantisation regions may be defined spanning the area containing these vectors or coordinates. Each of the vectors or coordinates may then be mapped to one or more quantised bits based on which of the quantisation region in which it falls.

All singular vectors of a singular vector distribution have unit norm. Therefore the singular vectors of the singular value distributions calculated by the first node 110 are independent of any amplitude scaling (for example, due to automatic gain control of the nodes) with which it receives the training signal.

However, the synchronization of the first node (with respect to the transmitting second node) will affect the phase with which the first node 110 receives each of the subcarriers of the first training signal and by extension the measured frequency responses of the subcarriers (the arguments of the frequency response values). The receiving first node 110 being out of sync with the transmitting second node 120 will introduce a phase ramp to the measured phase shifts of the subcarriers in the frequency domain (for example, with the measured phase shift of each subcarrier having a phase shift error proportional to its frequency). Shifting the phase of entries in the matrix shifts the phases of entries in the singular vectors of its singular value decomposition without changing their magnitudes. Therefore, in some embodiments in which the matrix includes entries equal or proportional to the measured frequency responses of the subcarriers, the secret key may be derived from the magnitudes of the entries of the one or more singular vectors (which are independent of any phase shifts introduced by synchronisation differences between the nodes 110, 120). The secret key may be defined from the magnitudes of the entries of the one or more singular vectors using scalar or vector quantisation as described above.

In use, methods 200 as described above may be performed by both of a pair of nodes 110, 120 to generate a secret key for communication by a channel 115 between the nodes that is known to both nodes. For example, by the second node 110 transmitting a first training signal received 210 by the first node 120, the first node 120 transmitting a second training signal received 210 by the second node 110, and each of the first and second nodes 110, 120 independently performing the second to fourth steps 220, 230, 240 of the method. If the channel is substantially reciprocal and the signal to noise ratio of the transmitted training signals is sufficiently high, the first and second nodes will have a high probability of generating identical secret keys.

In such embodiments, the method performed by the first node 110 may be considered to further comprise generating and/or transmitting a second training signal after receiving 210 the first training signal. The second training signal may be generated and/or transmitted before frequency responses are measured and/or used to construct 220 the matrix (for example, to reduce the time between the first and second training signals and minimise variation in the channel). Alternatively, the second training signal may be generated and/or transmitted after the SVD of the matrix is calculated 230 (for example, to allow the second training signal to be dependent upon the SVD of the matrix). The second training signal may be generated and/or transmitted before the secret key is derived 240 (for example, in order to allow information reconciliation to be performed by the two nodes 110, 120 on the one or more singular vectors from which the key is derived, or on quantised bits derived therefrom). The second training signal may be transmitted shortly after the first training signal, such that the channel is substantially identical and the secret keys generated by the two nodes 110, 120 are identical.

In some such embodiments, the first node 110 may generate 220 and calculate 230 a SVD of a matrix generated from frequency response values of the subcarriers before generating and/or transmitting the second training single to the second node 120. In such embodiments, the second training signal may be dependent upon the calculated SVD (and by extension on the frequency responses) while still allowing the second node 120 to generate the same secret key. For example, artificial noise derived from the SVD may be added to the training signal without modifying the secret key that will be generated therefrom by the second node 120. An example of such an embodiment is described below with reference to FIG. 3.

In some embodiments, the method performed by one or both of the nodes 110, 120 may comprise transmitting wireless signals encrypted using the derived secret key.

Figure 3:
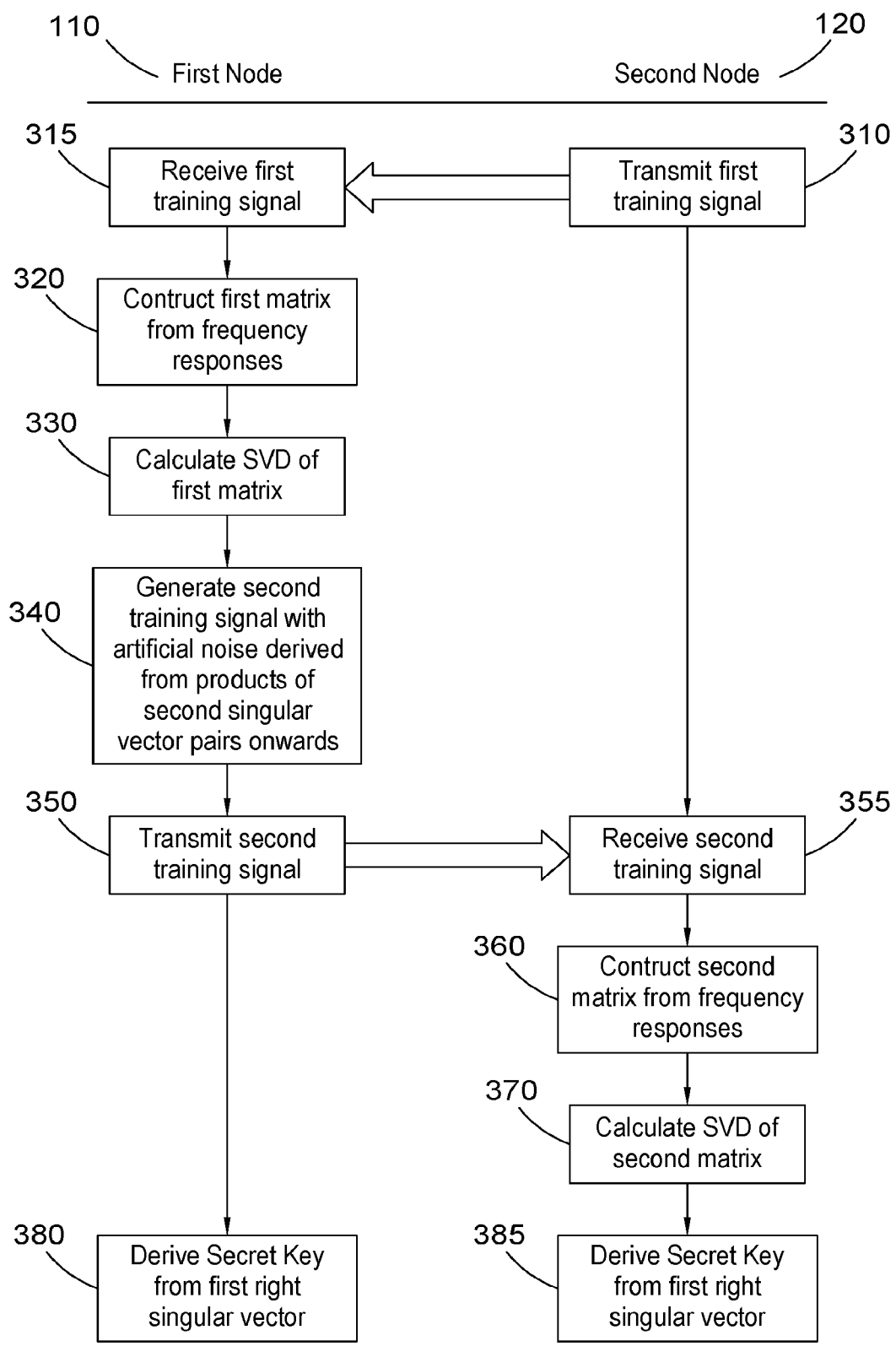
FIG. 3 is a flow chart of an embodiment of a method of operating first and second nodes to generate a shared secret key for wireless transmissions between the nodes.

FIG. 3 is a flowchart showing an embodiment of a method 300 of generating a secret key for communications between a first node 110 and a second node 120.

The method 300 comprises transmitting 310 a first training signal with the second node 120 and receiving 315 the first training signal with the first node 110. The training signal is a wireless signal comprising a plurality of subcarriers. The first training signal and its receipt by the first node 110 may comprise any of the optional features described above with reference to the first step 210 of FIG. 2; for example, the training signal may be an OFDM signal.

The $i^{th}$ subcarrier of the first training packet as transmitted is given by $T_{i,1}$ and the frequency response of the $i^{th}$ subcarrier transmitted via the channel 115 between the first and second nodes 110, 120 is given by $h_i$. The first node 110 therefore receives the first training packet with $h_i T_{i,1}$ as the $i^{th}$ subcarrier.

The first node 110 then constructs 320 a first matrix $H_1$ from the frequency responses of the plurality of subcarriers of the first training signal. In the example described herein, the first matrix $H_1$ comprises an entry equal to, or proportional to, the frequency response value of each of the plurality of subcarriers. The matrix $H_1$ and its construction may comprise any of the optional features described above with reference to the second step 220 of FIG. 2.

The entry of the first matrix $H_1$ corresponding to the $i^{th}$ subcarrier is therefore given by $H_{i,1} = x h_i$ where x is a constant of proportionality, which may be equal to 1. The frequency response $h_i$ may be estimated by the first node 110 by dividing the received $h_i T_{i,1}$ on the $i^{th}$ subcarrier by the known $i^{th}$ subcarrier $T_{i,1}$ of the first training packet as transmitted by the second node 120.

The first node 110 then calculates 330 the singular value decomposition (SVD) of the first matrix $H_1$ as described in the third step 230 of the method 200 described above.

After calculating 330 the SVD of the first matrix $H_1$, the first node 110 uses the first right singular vector $v_1$ of the SVD to derive 380 a secret key, and uses one or more of the second and above pairs of right and left singular vectors of the SVD to generate 340 a second training signal.

In alternative embodiments, one or more different singular vectors may be used to generate 380 the secret key instead of or in addition to the first right singular vector $v_1$. For example, in an embodiment in which entries of the first matrix $H_1$ are arranged in row major order, the first left singular vector $u_1$ may be used instead, or in other embodiments, first and second singular vectors may be used. In such alternative embodiments, one or more of the pairs of singular vectors of higher order than the singular vectors used to generate the secret key may be used to generate 340 the second training signal.

In the illustrated flowchart, the derivation 380 of the secret key by the first node 110 is shown as being performed after the generation 340 and transmission 350 of the second training signal by the first node 110, and after the construction 360 of, and calculation of an SVD of, a second matrix $H_2$ by the second node 120. This may allow information reconciliation to be performed by the first and second nodes before both derive 380, 385 secret keys. Alternatively, the first node 110 may derive 380 a secret key at any other time after calculation 330 of the SVD of first matrix, for example before generation 340 of second training signal.

The first node 110 generates 340 a second training signal for transmission 350 to the second node 120 using the one or more of the second and above pairs of right and left singular vectors of the SVD of the first matrix $H_1$.

In order for the second node 120 to derive an identical secret key from the second training signal (in subsequent step 385), the first right singular vector v_1 (or alternative one or more singular vectors from which the secret key is generated) of the singular value decomposition of a second matrix H_2 constructed (in subsequent step 360) from the frequency responses of the subcarriers of the second training signal must be identical to that of the singular value decomposition first matrix H_1. While this could be achieved by transmitting a second training signal identical to the first training signal, it is advantageous to use a different second training signal with added artificial noise in order to mitigate eavesdropping.

Entries of the second matrix $H_2$ are proportional to the frequency responses of the subcarriers measured by the receiving second node 120, which in turn are proportional to the amplitudes of the subcarriers as received by the receiving second node 120. Therefore the second training signal comprising added artificial noise on top of the first training signal results in the second matrix $H_2$ comprising artificial noise on top of the first matrix $H_1$.

Artificial noise added to the second training signal will be added to any channel estimate made by a node receiving the signal, irrespective of whether it is the second node 120 or an eavesdropping node 130 by making it harder for an eavesdropper to estimate the channel between the first and second nodes and thereby obtain the secret key.

The artificial noise is added to the second training signal such that artificial noise is added to the second matrix $H_2$ (the matrix generated from the frequency responses of the second training signal) in a vector subspace that defines the null space of the rank 1 approximation of the first matrix (and by extension of the second matrix). As the noise that differentiates the second matrix from the first matrix is added in the null space of the rank 1 approximation, the rank 1 approximation itself (and by extension the first right singular vector) is unmodified, allowing the same secret key to be generated from the second matrix. The added artificial noise does however, appear as noise to any other eavesdropping nodes.

The artificial noise added to the second matrix $H_2$ may be equal to a weighted sum of the products of the second and above pairs of right and left singular vectors (the second and above right singular vectors and the second and above left singular vectors are both within the null space of the rank 1 approximation). This artificial noise may be added to the second matrix $H_2$ by including artificial noise in each of the subcarriers of the second training signal equal to the entry $A_i$ of the matrix defined by the weighted sum A of the second and above singular vector pair products corresponding to the $i^{th}$ subcarrier, multiplied by the $i^{th}$ subcarrier $T_{i,1}$ of the first training signal, and divided by the entry $H_{i1}$ of the first matrix $H_1$ corresponding to the $i^{th}$ subcarrier.

The first matrix $$H_1 = \sum_{k=1}^{r} \sigma_k u_k v_k^H$$

has the same rank 1 approximation as the matrix $H_1+A$, where $$A = \sum_{k=2}^{r} a_k u_k v_k^H$$

and $a_k$ are arbitrary and/or randomly chosen coefficients (subject to power constraints for transmitting the second training signal), such that $$H_1 + A = \sigma_1 u_1 v_1^H + \sum_{k=2}^{r} (\sigma_k + a_k) u_k v_k^H.$$

The coefficients $a_k$ are limited such that $(\sigma_k+a_k)$ does not exceed or equal $\sigma_1$ for any k, thereby supplanting it as the first singular value and changing the order of the singular vectors of the SVD in the SVD of the second matrix $H_2$.

$T_{i,2}$, the $i^{th}$ subcarrier of the second training signal may therefore be generated by adding artificial noise equal to $T_{i,1}(A_i/H_{i,1})$ to the $i^{th}$ subcarrier of the first training signal $T_{i,1}$, where $H_{i,1}$ is the entry of the matrix $H_1$ corresponding to the $i^{th}$ subcarrier, and $A_i$ is entry in the same position in matrix A. Therefore, the $i^{th}$ subcarrier of the second training signal is given by $T_{i,2}=T_{i,1}(1+A_i/H_{i,1})$.

The first node 110 then transmits 350 the second training signal and the second node 120 receives 355 the second training signal. The second node 120 therefore receives the second training packet with $h_i T_{i,2}=h_i T_{i,1}(1+A_i/H_{i,1})$ as the $i^{th}$ subcarrier, where $h_i$ is the frequency response of the channel 115 between the first and second nodes 110, 120 as described above.

The second node 120 then then constructs 360 the second matrix $H_2$ from the frequency responses of the plurality of subcarriers of the second training signal in the same manner as the first node 110 generated 330 the matrix $H_1$ from the subcarriers of the first training signal.

As the only differences between the second and first training signals are the added artificial noise, the second node measures the frequency responses of the subcarriers of the second training signal in the same manner as the first nodes measures the frequency response of the subcarriers of the first signal. The second node measures each received subcarrier by comparing it to the subcarrier as transmitted without the added artificial noise, such that the added artificial noise effects the measured frequency response.

The entry of the second matrix $H_2$ corresponding to the $i^{th}$ subcarrier is therefore given by $H_{i,2}=xh_i T_{i,2}/T_{i,1}$ where x is the constant of proportionality between the estimated frequency responses and the entries of the matrices (which is the same for both the first and second matrices). This entry may therefore be simplified as $H_{i,2}=H_{i,1}T_{i,2}/T_{i,1}=H_{i,1}=H_{i,1}(1+A_i/H_{i,1})=H_{i,1}+A_i$. Therefore, the entire second matrix $H_2$ may be given by $H_2=H_1+A$, which as described above has the same rank 1 approximation as the first matrix $H_1$.

It will be appreciated that in alternative embodiments, the secret key may be derived from multiple singular vectors of the singular value decompositions of the first and second matrices (for example, from the first and second right singular vectors thereof). In such embodiments, the artificial noise A introduced to the second matrix $H_2$ is equal to a weighted sum of the products of one or more of the pairs of right and left singular vectors above the highest order singular vector from which the secret key is derived. For example, the artificial noise may be derived from the third and above pairs of right and left singular vectors if first and second singular vectors are used to derive the secret key.

After constructing 360 the second matrix $H_2$, the second node 120 calculates 370 the singular value decomposition of the second matrix $H_2$, which as described above will have the same rank 1 approximation (and by extension first left and right singular vectors) as the first matrix $H_1$.

After calculating 370 singular value decomposition of the second matrix H_2, the second node 120 derives 385 a secret key using only the first right singular vector v_1 (or in alternative embodiments as described in the paragraph above, from multiple singular vectors). In illustrated flowchart, the second node 120 derives 385 a secret key from the first right singular vector of the SVD of the second matrix H_2 at the same time as the first node 110 derives 380 a secret key from the first right singular vector of the SVD of the first matrix H_1.

The first and second nodes 110, 120 deriving secret keys from the first singular vectors of the SVDs of the first and second matrices $H_1$, $H_2$ may comprise quantising the first singular vectors into binary bits, as described above with reference to the fourth step 240 of the method shown in FIG. 2.

The first and second nodes 110, 120 will generate the same secret keys provided that they calculate identical first singular vectors (and/or bits into which they are quantised). However, a discrepancy or mismatch between the first singular vectors (and/or bits into which they are quantised) may be introduced by noise, interference, or hardware limitations of the nodes. The probability of such a mismatch may be reduced through information reconciliation between the two nodes.

Information reconciliation techniques are error correction techniques involving transmissions between the two nodes 110, 120. As information reconciliation techniques involve transmissions (such as of parities or permutations of blocks of the bits into which singular vectors are quantised) that can be received by eavesdropper nodes 130, privacy amplification techniques may be used, such as privacy amplification techniques utilising a universal hash function.

The first and second nodes 110, 120 may therefore derive 380, 385 identical secret keys for encrypting communications via the channel 115 between the nodes 110, 120.

The method may further comprise transmitting one or more signals encrypted using the derived secret key between the two nodes 110, 120.

Figure 4:
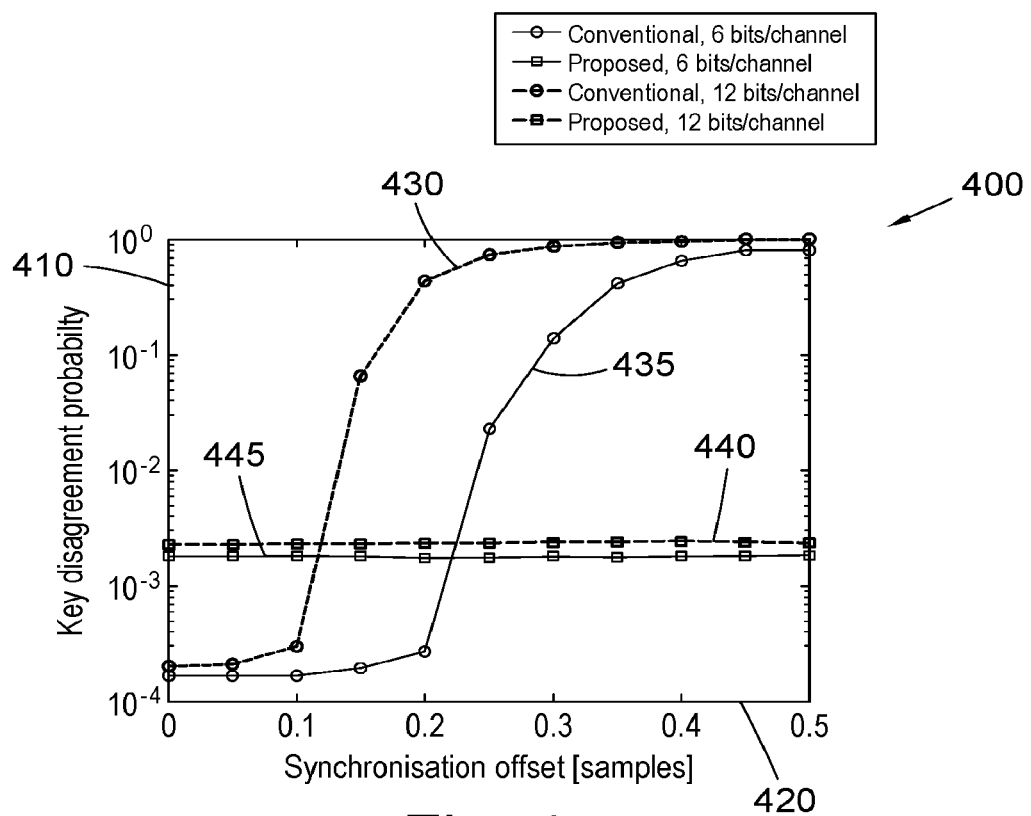
FIG. 4 is a graph of key disagreement probabilities at different synchronisation offsets.

FIG. 4 is a graph 400 showing probabilities 410 of pairs of nodes at different synchronisation offsets 420 failing to generate identical secret keys when using conventional unclaimed secret key generation methods and when using methods as described above in which secret keys are derived from the magnitudes of entries of a singular vector.

The probability of both of a pair of nodes generating different secret keys is given by a key disagreement probability (KDP) 410, which is preferably minimised to allow secret keys to be reliably generated for transmissions between a pair of nodes. The synchronization offsets between the pair of nodes is given as a proportion of the sample time with which the nodes receive signals.

The graph shows the key disagreement probabilities (KDPs) 410 at different synchronization offsets 420 for conventional unclaimed secret key generation methods 430, 435 in which the frequency responses of subcarriers of orthogonal frequency division multiplexing signals are directly quantised into bits of a secret key using vector quantisation techniques. In such methods, as the synchronization offset 420 increases between the two nodes, the phase shifts measured for the channels by the two nodes diverge. This increases the probability of the measured frequency responses being quantised into different bits and increases the KDP 410.

The KDPs of two different such methods 430, 435 are shown, a first method 430 using 6 bits/channel and a second method 435 using 12 bits/channel. The KDP 410 of the first method 430 increases significantly from less than 3×10-4 for synchronisation offsets of 0.2 samples or less to more than 0.1 for synchronisation offsets of 0.2 more. The KDP 410 of the second method 435 increases at even lower synchronization offsets, reaching more than 0.4 at a synchronisation offsets of 0.2 samples.

The graph shows the key disagreement probabilities (KDPs) 410 at different synchronization offsets 420 for two embodiments of methods 440, 445 in which secret keys are generated by quantising the magnitudes of the first right singular vector of a singular value decomposition of a matrix comprising entries equal to the frequency responses of the channels orthogonal frequency division multiplexing signals. As described above, in such methods, as the synchronization offset 420 increases the phase shifts measured for the channels by the two nodes diverge, but the magnitudes of the complex frequency response values do not. As such, the magnitudes of the entries of the singular vectors do not change with the synchronization offset 420 and the KDPs 410 remain generally constant at around 2×10-3. The KDPs 410 of two different such methods 440, 445 are shown, a first method 440 using 6 bits/channel and a second method 445 using 12 bits/channel.

The embodiments of the methods 440, 445 in which secret keys are generated by quantising the magnitudes of the first right singular vectors offer better key disagreement probabilities in situations where the synchronization offsets exceed 0.2 samples (or exceed 0.1 samples when using 12 bits/channel).

Figure 5:
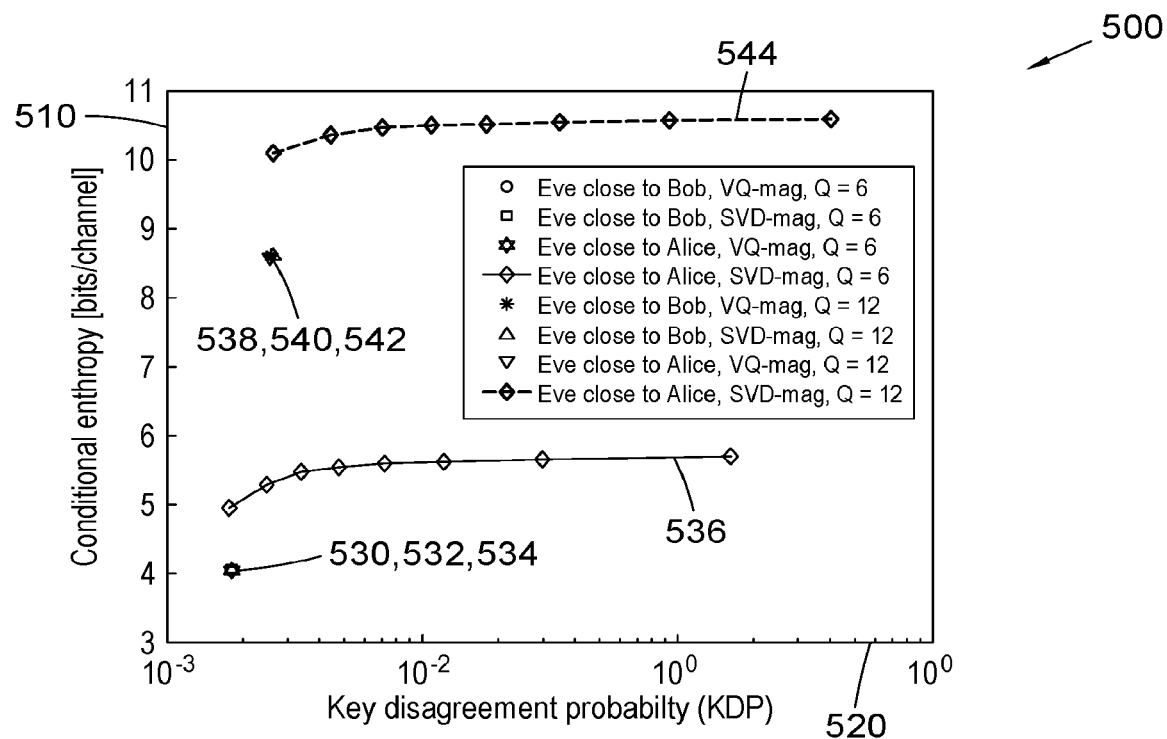
FIG. 5 is a graph of conditional entropy of eavesdropper nodes at different key disagreement probabilities.

FIG. 5 is a graph of conditional entropy 510 of an eavesdropper node 130 located close to one of a pair of nodes 110, 120 generating a secret key at different key disagreement probabilities (KDPs) 520 using conventional unclaimed secret key generation methods and methods as described above in which secret keys are derived from singular vectors at different key generation rates.

The eavesdropper node 130 is located very close to one node of the pair of nodes 110, 120 such that its channel with the other node of the pair of nodes is closely correlated to the channel 115 between the pair of nodes, with a correlation coefficient of 0.99. This represents a worst-case scenario as in use any eavesdroppers 130 would actually be less close to the nodes 110, 120 and less correlated with the channel 115.

The graph 500 shows the conditional entropies of: a first eavesdropper node 530 close to the second node 120 when the nodes 110, 120 generate secret keys using conventional unclaimed vector quantisation methods with a key generation rate of 6 bits/channel (Q=6); a second eavesdropper node 532 close to the second node 120 when the nodes 110, 120 generate secret keys using an embodiment of a method as described above with a key generation rate of 6 bits/channel; a third eavesdropper node 534 close to the first node 110 when the nodes 110, 120 generate secret keys using conventional unclaimed vector quantisation methods with a key generation rate of 6 bits/channel; a fourth eavesdropper node 536 close to the first node 110 when the nodes 110, 120 generate secret keys using an embodiment of a method as described above with a key generation rate of 6 bits/channel; a fifth eavesdropper node 538 close to the second node 120 when the nodes 110, 120 generate secret keys using conventional unclaimed vector quantisation methods with a key generation rate of 12 bits/channel (Q=12); a sixth eavesdropper node 540 close to the second node 120 when the nodes 110, 120 generate secret keys using an embodiment of a method as described above with a key generation rate of 12 bits/channel; a seventh eavesdropper node 542 close to the first node 110 when the nodes 110, 120 generate secret keys using conventional unclaimed vector quantisation methods with a key generation rate of 12 bits/channel; and an eighth eavesdropper node 544 close to the first node 110 when the nodes 110, 120 generate secret keys using an embodiment of a method as described above with a key generation rate of 12 bits/channel. The synchronisation offset is set to zero for all pairs of nodes, so the conventional methods are not penalised compared to the embodiments.

The conditional entropies 510 of the fourth and eighth eavesdropper nodes 536, 544 are plotted for multiple different key disagreement probabilities 520, whereas the conditional entropies of other eavesdropper nodes 530, 532, 534, 538, 540, 542 are only plotted for single key disagreement probabilities 520. The higher key disagreement probabilities of the fourth and eighth eavesdropper nodes 536, 544 correspond to increasing the power of the added artificial noise relative to the unmodified base training signal. Increasing the power of the artificial noise increases the KDP 520, by also increases the conditional entropy (the uncertainty) of the eavesdropper nodes 536, 544, protecting against eavesdropping.

Even if no artificial noise is added, the embodiments of methods deriving secret keys using the singular value decomposition have higher conditional entropies (1 bit/channel higher conditional entropies with a key generation rate of 6 bits/channel and 1.5 bits/channel higher conditional entropies with a key generation rate of 12 bits/channel) and offer greater protection against eavesdropping.

Figure 6:
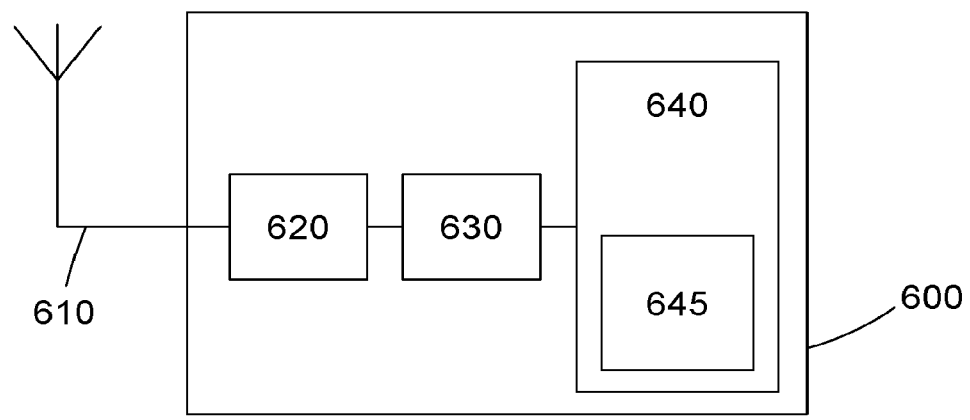
FIG. 6 is a diagram of a node configured to perform an embodiment of a method for generating a secret key.

FIG. 6 is a diagram of a wireless node 600 configured to perform embodiments of methods of generating secure keys as described above. The node 600 comprises an antenna 610, an input output module 620, a processor 630, and a memory 640 containing computer instructions 645.

The input/output module 620 is communicatively connected to the antenna 610 and is configured to transmit and receive signals via the antenna. The computer instructions 645 are executable by the processor 630 to cause the processor 630 and/or the node 600 to perform a method as described above.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A method comprising:
receiving, in a first node, a first training signal comprising a plurality of subcarriers from a second node, the first node being operated to generate a secret key for encrypting wireless transmissions between the first node and the second node;
constructing a matrix from frequency responses of each of the plurality of subcarriers of the first training signal at the first node;
computing a singular value decomposition of the matrix; and
deriving a secret key from one or more singular vectors of the singular value decomposition.

2. The method according to claim 1 wherein the first training signal is an orthogonal frequency-division multiplexing signal.

3. The method according to claim 1 wherein the secret key is derived from magnitudes of entries of the one or more singular vectors.

4. The method according to claim 1 wherein the one or more singular vectors is a first right singular vector of the computed singular value decomposition.

5. The method according to claim 1 wherein the matrix is constructed with entries equal or proportional to the frequency responses of each of the plurality of subcarriers.

6. The method according to claim 1 further comprising generating and transmitting a second training signal.

7. The method according to claim 6 wherein generating the second training signal comprises including artificial noise in each of the subcarriers of the second training signal, the artificial noise added to each subcarrier being equal to an entry corresponding to that subcarrier in a matrix defined by a weighted sum of products of pairs of singular vectors of higher order than the one or more singular vectors from which the secret key is derived, multiplied by that subcarrier of the first training signal, and divided by the entry corresponding to that subcarrier in the matrix constructed from the frequency responses of each of the plurality of subcarriers of the first training signal at the first node.

8. The method according to claim 6 wherein generating the second training signal comprises adding artificial noise to the first training signal in a null space of a matrix defined by a sum of products of the one or more singular vectors from which the secret key is derived and the singular vectors with which they are paired in the singular value decomposition.

9. One or more non-transitory storage media comprising computer instructions executable by one or more processors, the computer instructions when executed by the one or more processors causing the processors to perform a method comprising:
receiving, in a first node, a first training signal comprising a plurality of subcarriers from a second node, the first node being operated to generate a secret key for encrypting wireless transmissions between the first node and the second node;
constructing a matrix from frequency responses of each of the plurality of subcarriers of the first training signal at the first node;
computing a singular value decomposition of the matrix; and
deriving a secret key from one or more singular vectors of the singular value decomposition.

10. A wireless node comprising an antenna, a memory and a processor, the memory comprising computer instructions executable by the processor, the computer instructions when executed by the processor causing the processor to perform a method comprising:
receiving, in the node, a first training signal comprising a plurality of subcarriers from another node, the node being operated to generate a secret key for encrypting wireless transmissions between the node and the another node;

constructing a matrix from frequency responses of each of the plurality of subcarriers of the first training signal at the node;
computing a singular value decomposition of the matrix; and
deriving a secret key from one or more singular vectors of the singular value decomposition.

11. The node according to claim 10 wherein the first training signal is an orthogonal frequency-division multiplexing signal.

12. The node according to claim 10 wherein the secret key is derived from magnitudes of entries of the one or more singular vectors.

13. The node according to claim 10 wherein the one or more singular vectors is a first right singular vector of the computed singular value decomposition.

14. The node according to claim 10 wherein the matrix is constructed with entries equal or proportional to the frequency responses of each of the plurality of subcarriers.

15. The node according to claim 10 further comprising generating and transmitting a second training signal.

16. The node according to claim 15 wherein generating the second training signal comprises including artificial noise in each of the subcarriers of the second training signal, the artificial noise added to each subcarrier being equal to an entry corresponding to that subcarrier in a matrix defined by a weighted sum of products of pairs of singular vectors of higher order than the one or more singular vectors from which the secret key is derived, multiplied by that subcarrier of the first training signal, and divided by the entry corresponding to that subcarrier in the matrix constructed from the frequency responses of each of the plurality of subcarriers of the first training signal at the node.

17. The node according to claim 15 wherein generating the second training signal comprises adding artificial noise to the first training signal in a null space of a matrix defined by a sum of products of the one or more singular vectors from which the secret key is derived and the singular vectors with which they are paired in the singular value decomposition.

* * * * *